United States Patent
Kohno et al.

(10) Patent No.: US 8,569,263 B2
(45) Date of Patent: Oct. 29, 2013

(54) METHOD OF PRODUCING SILANE-MODIFIED CATIONIZED CELLULOSE

(75) Inventors: Youichirou Kohno, Sumida-ku (JP); Yoko Osako, Sumida-ku (JP); Atsushi Ito, Sumida-ku (JP)

(73) Assignee: LION Corporation, Sumida-ku, Tokyo (JP)

( * ) Notice: Subject to any disclaimer, the term of this patent is extended or adjusted under 35 U.S.C. 154(b) by 720 days.

(21) Appl. No.: 12/673,914

(22) PCT Filed: Aug. 22, 2008

(86) PCT No.: PCT/JP2008/065002
§ 371 (c)(1), (2), (4) Date: Feb. 17, 2010

(87) PCT Pub. No.: WO2009/025354
PCT Pub. Date: Feb. 26, 2009

(65) Prior Publication Data
US 2011/0218336 A1 Sep. 8, 2011

(30) Foreign Application Priority Data
Aug. 22, 2007 (JP) ................................ 2007-216089

(51) Int. Cl.
*A61K 31/716* (2006.01)
*C08B 11/00* (2006.01)
*C08B 11/14* (2006.01)

(52) U.S. Cl.
USPC ................ 514/57; 514/54; 536/43; 536/55.3; 536/56; 536/84

(58) Field of Classification Search
USPC .................... 514/57, 54; 536/56, 84, 43, 55.3
See application file for complete search history.

(56) References Cited

U.S. PATENT DOCUMENTS

| | | |
|---|---|---|
| 4,137,399 A | 1/1979 | Hulsmann et al. |
| 4,474,950 A | 10/1984 | Felcht et al. |

FOREIGN PATENT DOCUMENTS

| | | |
|---|---|---|
| JP | 47-35073 | 11/1972 |
| JP | 51-2103 | 1/1976 |
| JP | 53-43786 | 4/1978 |
| JP | 61-195138 | 8/1986 |
| JP | 6-39481 | 5/1994 |
| JP | 08-183801 | 7/1996 |
| JP | 2004-155805 | 6/2004 |
| JP | 2005-171089 | 6/2005 |
| JP | 2007-211167 | 8/2007 |

OTHER PUBLICATIONS

Sadaki et al.; JP 2005-171089; Jun. 30, 2005 (English Machine Translation).*

* cited by examiner

*Primary Examiner* — Shaojia Anna Jiang
*Assistant Examiner* — Michael C Henry
(74) *Attorney, Agent, or Firm* — Merchant & Gould P.C.

(57) ABSTRACT

A method of producing silane-modified cationized cellulose that has excellent aqueous dispersibility, including: a step (1) of cationizing water-soluble cellulose ether in a presence of alkali in a mixed solvent of a water-compatible organic solvent to obtain slurry comprising cationized cellulose; a step (2) of adding acid to said slurry and neutralizing said alkali; a step (3) of reacting said cationized cellulose obtained after said neutralization with an aminosilane compound and a step (4) of drying the obtained slurry, wherein: drying is conducted in step (4) at 115-160° C. until weight loss on drying is 5% by weight or less, or there is also including a step (5) of adding a water-compatible organic solvent or a mixed solvent of a water-compatible organic solvent and water to the cationized cellulose after the neutralization so that water content in a whole solvent that contacts the cationized cellulose is 10% by mass or less.

14 Claims, No Drawings

METHOD OF PRODUCING SILANE-MODIFIED CATIONIZED CELLULOSE

TECHNICAL FIELD

This application is a National Stage Application of PCT/JP2008/065002, filed 22 Aug. 2008, which claims benefit of Serial No. 2007-216089, filed 22 Aug. 2007 in Japan and which application(s) are incorporated herein by reference. To the extent appropriate, a claim of priority is made to each of the above disclosed applications.

The present invention relates to a method of producing silane-modified cationized cellulose, and to silane-modified cationized cellulose which is produced by the aforementioned production method.

Priority is claimed on Japanese Patent Application No. 2007-216089, filed Aug. 22, 2007, the content of which is incorporated herein by reference.

BACKGROUND OF THE INVENTION

As water-soluble cellulose ether such as hydroxyalkyl cellulose exhibits hydrophilicity and thickening properties, it is widely used in a variety of fields such as those pertaining to thickening agents, adhesives, dispersants, and emulsion stabilizers. In these applications, as water-soluble cellulose ether is generally dissolved for use in water or a mixed solvent containing water (hereinafter referred to as "aqueous solvent"), it is ordinarily used in microparticle form for reasons of solubility.

However, as this microparticle-type of water-soluble cellulose ether has very high solubility in water or aqueous solvent, when introduced without alteration into water or aqueous solvent, only the surface of each particle moistens with water and dissolves, and neighboring particles bond into agglomerations, producing so-called undissolved powder lumps. Once these gel clumps are produced, the contact area of the water-soluble cellulose ether and the water is greatly reduced, and it takes time for the water-soluble cellulose ether to completely dissolve, which is a problem in terms of industrial process.

To counter this type of problem, glyoxal treatment is known where the water-soluble cellulose ether is treated with glyoxal to raise hydrophobicity and enhance aqueous dispersibility. According to glyoxal treatment, glyoxal reacts with hydroxyl groups of water-soluble cellulose ether, resulting in crosslinkage of the glyoxal and the water-soluble cellulose ether due to hemiacetal bonding. As this crosslinkage hydrolyzes due to alkali and heat, water-soluble cellulose ether that has undergone glyoxal treatment disperses with excellent aqueous dispersibility when introduced into water or aqueous solvent, and subsequently manifests excellent solubility due to alkali and heat.

With respect to glyoxal treatment, however, there is demand for alternative techniques, because glyoxal has been designated as a mutagenic substance.

As alternative techniques to glyoxal treatment, silane modification methods which use silane compounds have been proposed. As silane modification methods, for example, there have been proposals of methods which use amino silane and epoxy silane (Patent Documents 1, 2), methods which use alkyltrialkoxyl silane, alkyltetraacyloxy silane, tetraalkoxy silane, and tetraacyloxy silane (Patent Documents 3-6), and so on.

On the other hand, production of cationized cellulose by cationization of water-soluble cellulose ether is being conducted. As a method of producing cationized cellulose, there is known to be a method which causes water-soluble cellulose ether to react with a cationizing agent in the presence of alkali (Patent Document 7). The aforementioned cationized cellulose is widely used, primarily as a conditioning agent for shampoos and body soaps.

Patent Document 1: Japanese Examined Patent Application, Second Publication No. S51-2103
Patent Document 2: Japanese Unexamined Patent Application, First Publication No. S47-35073
Patent Document 3: Japanese Examined Patent Application, Second Publication No. H6-39481
Patent Document 4: Japanese Unexamined Patent Application, First Publication No. H8-183801
Patent Document 5: Japanese Laid-Open Patent Application No. 2004-155805
Patent Document 6: Japanese Unexamined Patent Application, First Publication No. S61-195138
Patent Document 7: Japanese Laid-Open Patent Application No. 2005-171089

DISCLOSURE OF THE INVENTION

Problems to be Solved by the Invention

Given that cationized cellulose has higher hydrophilicity than water-soluble cellulose ether, its aqueous dispersibility is even poorer. As with water-soluble cellulose ether, so also with respect to cationized cellulose, it is conceivable to treat cationized cellulose by a silane modification method.

However, according to studies of the present inventors, even when the conventional silane modification methods which are used with respect to water-soluble cellulose ether are applied to cationized cellulose, dispersibility of the obtained silane-modified cationized cellulose relative to water or aqueous solvent is insufficient, and large amounts of melted residue are generated.

The present invention was made in light of the foregoing circumstances, and its object is to offer a production method which is capable of producing silane-modified cationized cellulose that has excellent aqueous dispersibility, and silane-modified cationized cellulose which is produced by the aforementioned manufacturing method.

Means to Solve the Problems

As a result of diligent study, the present inventors discovered that the aforementioned problems are solved by placing the pertinent cationized cellulose in a solvent environment with a water volume equal to or less than a fixed value using a water-compatible organic solvent at least before conduct of silane treatment, and by subsequently conducting silane treatment using a fixed quantity of aminosilane compound. They further discovered that, even in the case where the aforementioned water-content adjustment process is not conducted, the aforementioned problems are solved by conducting drying after silane treatment at a temperature of 115° C.-160° C. until weight loss on drying reaches a fixed proportion or less, thereby perfecting the present invention.

A first aspect of the present invention which solves the aforementioned problems is a method of producing silane-modified cationized cellulose that includes the below-mentioned steps (1) to (4), or that further includes the below-mentioned step (5).

Step (1): A step of cationizing water-soluble cellulose ether in a presence of alkali in a mixed solvent of a water-compatible organic solvent and water to obtain slurry comprising cationized cellulose.

Step (2): A step of adding acid to the slurry and neutralizing the alkali.

Step (3): A step of reacting the cationized cellulose obtained in the aforementioned step (2) reacts with an aminosilane compound which is 0.3-10% by mass relative to an amount of water-soluble cellulose ether used as raw material of the cationized cellulose.

Step (4): A step of drying and powderizing a product obtained in the step (3), wherein drying is conducted at a temperature of 115-160° C. until weight loss on drying is 5% by weight or less in the case where the below-mentioned step (5) is not conducted.

Step (5): A step of adding a water-compatible organic solvent or a mixed solvent of a water-compatible organic solvent and water to said cationized cellulose obtained in the step (2) so that water content in a whole solvent that contacts said cationized cellulose is 10% by mass or less.

A second aspect of the present invention is silane-modified cationized cellulose which is produced by the method of producing silane-modified cationized cellulose according to any of claims 1 to 5.

Effects of the Invention

According to the method of producing silane-modified cationized cellulose of the present invention, it is possible to manufacture silane-modified cationized cellulose that has excellent aqueous dispersibility.

DETAILED DESCRIPTION OF THE INVENTION

<<Method of Producing Silane-modified Cationized Cellulose>>

The production method of a first aspect of the present invention includes the aforementioned steps (1)-(4), or further includes the step (5). The respective steps are described below in greater detail.

<Step (1)>

In the step (1), water-soluble cellulose ether is cationized in the presence of alkali in a mixed solvent of water and water-compatible organic solvent to obtain slurry containing cationized cellulose.

As water-soluble cellulose ether, one may cite hydroxyalkyl cellulose ether. Hydroxyalkyl cellulose ether is a substance wherein hydroxyakyl groups are bonded as substituents to the hydroxyl groups of cellulose.

The aforementioned hydroxyalkyl groups are groups expressed by the general formula -(A-O)$_n$H. In the formula, A is alkylene groups with 2-3 carbon atoms, of which ethylene groups or propylene groups are preferable, and ethylene groups are more preferable. n is the average number of added mols of alkylene oxide. With respect to the aforementioned average number of added mols, it is preferable to have 0.5-3.5 mols relative to 1 mol of glucose residue (unit skeleton) of water-soluble cellulose ether, and 1-2.5 mols is more preferable.

Hydroxyalkyl cellulose ether may also have substituents other than hydroxyalkyl groups. As the aforementioned substituents, one may cite, for example, alkyl groups and the like with 1-3 carbon atoms.

As hydroxyalkyl cellulose ether, one may specifically cite hydroxyethyl cellulose (HEC), hydroxypropyl cellulose (HPC), methyl-hydroxyethyl cellulose (MHEC), methyl-hydroxypropyl cellulose (MHPC), ethyl-hydroxyethyl cellulose (EHEC), and so on. Among these, HEC is preferable due to its low cost and its common use in applications involving thickeners and the like. Any one of these may be used alone, or they may be used in combinations of two or more.

With respect to the pertinent hydroxyalkyl cellulose ether, a commercially available product may be used, or it may be synthesized. For example, hydroxyalkyl cellulose ether may be synthesized by subjecting cellulose to alkali treatment to obtain alkali cellulose, and by reacting this with alkylene oxide.

As commercially available products, there is HEC AL-15, AH-15, AX-15, SW-25F, SG-25F, and SY-25F manufactured by Sumitomo Seika Chemicals Co., Ltd., as well as HEC Daicel SE550, SE600, and SE900 manufactured by Daicel Chemical Industries, Ltd.

As to the viscosity of water-soluble cellulose ether, it is preferable that viscosity at 20° C. in an aqueous solution of 2% by mass be 5-35,000 mPa·s. Viscosity refers to viscosity after one minute from start of measurement by a B-type viscometer.

As water-compatible organic solvent, it is sufficient if the substance forms a uniform solution when mixed with water, and one may cite, for example, alcohols with 1-4 carbon atoms, acetone, and so on. Among these, alcohols with a carbon number of 1 to 4 are preferable. Specifically, one may cite methanol, ethanol, isopropanol, n-propanol, and t-butylalcohol, among others. Among these, ethanol, isopropanol, and t-butylalcohol are preferable from the standpoints of price and safety.

With respect to the proportion of water in the mixed solvent, from the standpoints of inhibiting side reactions and efficiently promoting cationizing reaction, 12-30% by mass is preferable, and 12-20% by mass is more preferable. By setting this at the minimum level or above, the cationizing reaction can be promoted more efficiently. Setting this at the maximum level or above is undesirable from the standpoints of handling and manufacturability, as the cationized cellulose and water-soluble cellulose ether that are produced dissolve, lowering yield, and as gelification occurs due to partial dissolution in water.

As for the amount of mixed solvent to be used, from the standpoints of avoiding localized progression of cationization of water-soluble cellulose ether and enhancing volumetric efficiency of the reaction vessel, 200-1500 parts by mass relative to 100 parts by mass of water-soluble cellulose ether is preferable, and 300-800 parts by mass is more preferable.

As alkali, one may cite alkali metal hydroxides such as sodium hydroxide, potassium hydroxide, and lithium hydroxide. Among these, sodium hydroxide is preferable due to its low cost.

With respect to the amount of alkali to be used, an amount such that alkali content is 0.1-10% by mass relative to water-soluble cellulose ether is preferable.

Cationization of water-soluble cellulose ether may be accomplished by reacting water-soluble cellulose ether and a cationizing agent.

As a cationizing agent, it is sufficient if the substance reacts with hydrogen atoms (active hydrogen) of hydroxyl groups of water-soluble cellulose ether, and imparts cationic properties to the water-soluble cellulose ether. Specifically, one may cite glycidyl trialkyl ammonium halides such as glycidyl trimethyl ammonium chloride, glycidyl triethyl ammonium chloride, glycidyl trimethyl ammonium bromide, and glycidyl triethyl ammonium bromide; and ammonium halide compounds such as dimethyldiallyl ammonium chloride, methacryloyloxyethylene trimethyl ammonium chloride, and 3-chloro-2-hydroxypropyl trimethyl ammonium chloride.

Among these, from the standpoints of low cost and high reactivity, glycidyl trimethyl ammonium chloride is preferable.

With respect to the amount of cationizing agent to be used, from the standpoint of raising the yield of cationized cellulose and from the standpoint of avoiding loss of economic benefit due to effects that do not compensate for the amount used, it is preferable to have an amount that constitutes 0.1-1.4 mol relative to glucose residue unit skeleton in water-soluble cellulose ether, and an amount that constitutes 0.3-1.2 mol is more preferable.

The reaction of water-soluble cellulose ether and cationizing agent may, for example, be accomplished by mixing and agitating water-soluble cellulose ether, the aforementioned mixed solvent, and alkali, after which the cationizing agent is added, and heating to a prescribed reaction temperature is conducted.

With respect to reaction temperature during this time, from the standpoint of accelerating reaction and shortening reaction time, and from the standpoint of preventing reaction from proceeding too rapidly, the range is ordinarily within 40-60° C., and 45-55° C. is preferable.

As for reaction time, one cannot make a sweeping generalization, because it varies according to reaction temperature, but it is ordinarily on the order of 2-4 hours.

In this manner, a slurry containing cationized cellulose is obtained.

There are no particular limitations on the degree of cationization of the aforementioned cationized cellulose, and it may be suitably selected according to the purpose of use of the silane-modified cationized cellulose that is finally obtained. 0.3-2.5% by mass is preferable, and 0.5-2.0% by mass is more preferable. When the aforementioned degree of cationization is 0.3% by mass or higher, the cationic properties of the aforementioned cationized cellulose, and consequently the cationic properties of the silane-modified cationized cellulose that is finally obtained, are enhanced, and its functions (thickening properties, etc.) are improved. When 2.5% by mass or less, reactivity with amino-silane compounds is satisfactory, and the aqueous dispersibility of the silane-modified cationized cellulose is also enhanced.

Here, the degree of cationization of cationized cellulose signifies the proportion of nitrogen atoms per unit skeleton of glucose residue of the aforementioned cationized cellulose. The degree of cationization may be measured by the method recorded on the O-[2-hydroxy-3-(trimethylammonio)propyl] hydroxyethyl cellulose chloride page of the Japanese Standards of Quasi-Drug Ingredients 2006 (Yakuji Nippo, Ltd.). The aforementioned nitrogen atoms derive from the cationizing agent, and the degree of cationization may be regulated by regulating the amount of cationizing agent that is used, among other ingredients.

<Step (2)>

In the step (2), the alkali is neutralized by adding acid to the slurry obtained in the aforementioned step (1).

As acid, one may cite, for example, strong acids such as sulfuric acid, hydrochloric acid, and nitric acid, and weak acids such as acetic acid and phosphoric acid. Among these, hydrochloric acid, sulfuric acid and nitric acid are preferable due to their low cost.

With respect to the amount of acid to be used, it suffices if it is suitably adjusted so that pH falls within the below-mentioned desired range when the final silane-modified cationized cellulose is turned into an aqueous solution. As the aminosilane compound used in the step (3) is alkaline, it is preferable to have an amount where the pH of the slurry after addition of the aforementioned acid is lower than the aforementioned desired pH. Specifically, it is preferable to have an amount where the pH of the slurry after addition of the aforementioned acid is 2.0-6.0 under conditions of 25° C., and an amount where it is 3.5-5.5 is more preferable. When the aforementioned pH is within the aforementioned range, the aqueous dispersibility of the silane-modified cationized cellulose that is finally obtained is satisfactory, and its solubility in water is also satisfactory.

<Step (3)>

In the step (3), the cationized cellulose obtained in the aforementioned step (2) is reacted with an aminosilane compound which is 0.3-10% by mass relative to the amount of water-soluble cellulose ether used as raw material of the aforementioned cationized cellulose. The effects of the present invention are obtained by reacting the cationized cellulose with the aforementioned prescribed amount of aminosilane compound.

As the aminosilane compound, one may cite, for example, 3-aminopropyltrimethoxy silane, 3-aminopropyltriethoxy silane, 3-aminopropylmethyldimethoxy silane, 3-aminopropyltrimethylethoxy silane, N-2-aminoethyl-3-aminopropyltrimethoxy silane, N-2-aminoethyl-3-aminopropyltriethoxy silane, 3-aminopropyldiethoxy silane, 4-aminobutylmethyldiethoxy silane, N-2-carboethoxyethyl-3-aminopropyltriethoxy silane, and so on.

Among these, from the standpoint that release from methanol does not occur when the silane-modified cationized cellulose that is finally obtained is used in shampoo, body soap or the like, it is preferable to use 3-aminopropyltriethoxy silane, N-2-aminoethyl-3-aminopropyltriethoxy silane, 3-aminopropyltrimethylethoxy silane, 3-aminopropyldiethoxy silane, 4-aminobutylmethyldiethoxy silane, and N-2-carboethoxyethyl-3-aminopropyltriethoxy silane. As the aminosilane compound, one may use commercially available products such as KBE-903, KBE-603, and KBE-9103 manufactured by Shin-Etsu Chemical Co., Ltd., and AY43-059 manufactured by Dow Corning Toray Co., Ltd.

The amount of aminosilane compound to be used is 0.3-10% by mass relative to the amount of water-soluble cellulose ether used as raw material of the cationized cellulose that is reacted with the pertinent aminosilane compound; 0.5-10% by mass is preferable, 0.9-5% by mass is more preferable, and 0.9-3% by mass is still more preferable. Moreover, in the case of the method where the below-mentioned step (5) is not conducted, it is preferable that the amount of aminosilane compound that is used be somewhat larger; 1% by mass to 8% by mass is more preferable, and 2% by mass to 5% by mass still more preferable. When the amount of the aforementioned aminosilane compound that is used is 0.3% by mass or more, aqueous dispersibility is satisfactory, and when it is within 10% by mass, aqueous dispersibility is satisfactory, the amount of active ingredient of cationized cellulose is high, and cost is reduced, which is advantageous from an industrial standpoint.

There are no particular limitations on the method of reacting cationized cellulose and an aminosilane compound (silane treatment method), and conventional silane treatment methods may be used according to purpose. However, in the case where the step (5) is conducted, after the step (5), it is necessary to conduct silane treatment without bringing the cationized cellulose into contact with a solvent with a water content of over 10% by mass (water, mixed solvents in which the proportion of water is 10% by mass or more, and the like).

As the cationized cellulose that is supplied for the reaction of the step (3), one may use the unaltered slurry containing cationized cellulose after neutralization that was obtained in the step (2), or one may use a cake or dried product obtained by deliquoring the slurry obtained in the step (2), and partially or completely removing the solvent. With respect to the step (5), one may use without alteration a slurry or cake for which water content in the solvent is 10% by mass or less, or one may use a cake or dried product obtained by partially or completely removing the solvent of the aforementioned slurry or cake.

There are no particular limitations on the method of deliquoring the slurry obtained in the step (2), and one may use conventional solid-liquid separation methods known to those skilled in the art such as filtration or centrifugation. For example, it may be accomplished by using a centrifugal deliquoring device which uses filter fabric. It is preferable that deliquoring treatment be conducted so that solid content in the cake is 30-80% by mass.

As preferable silane treatment methods, one may cite a method wherein an aminosilane compound is added to a slurry of the aforementioned cationized cellulose, reaction is induced, and drying is subsequently conducted; or a method wherein an aminosilane compound is added to a cake or dried product by means such as conducting atomization by spray or the like, reaction is induced, and drying is subsequently conducted. In this case, in order to uniformly conduct silane treatment, it is preferable to conduct agitation after addition of the aminosilane compound.

With respect to silane treatment, there are no particular limitations on the reaction temperature when inducing reaction of the cationized cellulose and the aminosilane compound, and it may be suitably selected according to purpose. A reaction temperature of 20-80° C. is preferable; 25-75° C. is more preferable; and 30-70° C. still more preferable. When the aforementioned temperature is 20° C. or higher, the reaction fully proceeds, and aqueous dispersibility of the obtained silane-modified cationized cellulose is satisfactory, and when 80° C. or less, the color tone of the aforementioned silane-modified cationized cellulose is satisfactory.

There are no particular limitations on reaction time, and it may be suitably selected according to reaction temperature, purpose, and so on.

With respect to reaction time, 5-120 minutes is preferable, 10-100 minutes is more preferable, and 15-80 minutes still more preferable. When the aforementioned reaction time is 5 minutes or more, the reaction fully proceeds, and aqueous dispersibility of the obtained silane-modified cationized cellulose is satisfactory, and when within 120 minutes, the color tone of the aforementioned silane-modified cationized cellulose is satisfactory.

<Step (4)>

In the step (4), the reaction product of the cationized cellulose and the aminosilane compound cellulose obtained in the aforementioned step (3) is dried, and powderized.

In the case where the step (5) is not conducted, with respect to the drying of the step (4), water and water-compatible organic solvent or the like are evaporated at a temperature of 115-160° C., and drying is conducted until the weight loss on drying is 5% by weight or less.

In this case, if drying temperature is higher than 115° C., adequate aqueous dispersibility and solubility are obtained. On the other hand, if 160° C. or less, an ameliorative effect is obtained with respect to dispersibility and solubility, and discoloration is inhibited. From the standpoint of obtaining more potent effects with a smaller additive amount of silane, 120° C. or higher is preferable, and 130° C. or higher is more preferable.

Drying is conducted until the weight loss on drying measured by the method described below is 5% by weight or less.

(Method of Measuring Weight Loss on Drying)

Weight loss on drying is obtained based on the following formula by measuring out a dried sample of approximately 1 g (A) in a weighing bottle of predetermined constant mass (B), and conducting drying for 2 hours at 105° C. in a drier, after which the lid of the weighing bottle is closed, removal from the drier is conducted, and weight (C) after cooling for 30 minutes in a dessicator is measured.

Weight loss on drying (%)=[$A-(C-B)$]/$A$×100

It is preferable that treatment be conducted until the aforementioned weight loss on drying is 1% by weight or less, and 0.5% by weight or less is more preferable. As cationized cellulose is obtained with smaller weight loss on drying, its dispersibility in water improves, and its dissolution time decreases. Otherwise, deliquoring treatment may also be conducted before the drying of the step (4).

Deliquoring treatment may, for example, be conducted by using a centrifugal deliquoring device which uses filter fabric.

With respect to drying, there are no particular limitations on the method so long as drying can be conducted as mentioned above at a temperature of 115-160° C. until weight loss on drying is 5% by weight or less, and conventional methods may be used.

For example, drying may be conducted under normal pressure or reduced pressure under the aforementioned temperature conditions. From the standpoint of the rate of evaporation and prevention of thermal degradation, it is preferable to conduct it at reduced pressure. For example, it may be conducted under reduced pressure on the order of 1-30 Torr during agitation with a conventional agitated vacuum drier, oscillating vacuum drier or the like.

Otherwise, drying temperature is not limited in the aforementioned manner when the step (5) is conducted. From the standpoint of handling as powder, it is preferable to conduct drying until weight loss on drying is 10% by weight or less, and 5% by weight or less is more preferable. Drying may be conducted with the same equipment and methodology described above.

<Step (5)>

The water content used during cationization remains in the slurry obtained by the aforementioned step (2), and water content in the whole solvent in the aforementioned slurry is ordinarily 12-30% by mass.

In the step (5), water-compatible organic solvent or a mixed solvent of water and water-compatible organic solvent is added to the cationized cellulose after the aforementioned neutralization so that water content in the whole solvent that contacts the pertinent cationized cellulose is 10% by mass or less. From the standpoints of dispersibility and dissolution time, it is preferable that water content in the whole solvent which contacts the pertinent cationized cellulose be 2-7%.

As the water-compatible organic solvent, the same water-compatible organic solvents cited in the aforementioned step (1) may be cited.

With respect to the proportion of water in the mixed solvent of water and water-compatible organic solvent, it is acceptable if water content in the whole solvent (mother liquor) contained in the slurry of cationized cellulose after addition of the pertinent mixed solvent or in cake obtained by subjecting the aforementioned slurry to deliquoring treatment is within a range of 10% by mass or less, and it may be suitably selected according to the amount of water content in the slurry or cake to which the pertinent mixed solvent is added.

As methods for carrying out the step (5), one may specifically cite the following methods (5-1) and (5-2), among others.

Method (5-1): A method wherein a water-compatible organic solvent or a mixed solvent of water-compatible organic solvent and water is added to the slurry obtained in the aforementioned step (2), and stirring is conducted.

Method (5-2): A method wherein the slurry obtained in the aforementioned step (2) is subjected to deliquoring treatment, and a water-compatible organic solvent or a mixed solvent of water-compatible organic solvent and water is added to the obtained cake.

As method (5-2), one may more specifically cite the following methods (5-2a) and (5-2b), among others.

Method (5-2a): A method wherein the neutralized slurry obtained in the aforementioned step (2) is deliquored, after which the obtained cake is redispersed in the water-compatible organic solvent or mixed solvent to produce a slurry.

Method (5-2b): A method wherein the neutralized slurry obtained in the aforementioned step (2) is deliquored, after which the water-compatible organic solvent or mixed solvent is showered onto the obtained cake.

In the case where the cake is treated by showering, a continuous treatment method may be adopted wherein the cake is placed on a conveyor or the like, and showering is conducted thereon.

After these treatments, one may further conduct deliquoring treatment in order to remove the water-compatible organic solvent or mixed solvent that was employed.

In the case of method (5-1) and (5-2a), it is acceptable if the aforementioned solvent is added so that water content in the mother liquor contained in the slurry following addition of the water-compatible organic solvent or mixed solvent of water and water-compatible organic solvent is 10% by mass or less. In the case where the cake is treated by showering as in method (5-2b), it is acceptable if showering is conducted so that water content in the mother liquor contained in the cake is finally 10% by mass or less.

In method (5-2), there are no particular limitations on the deliquoring treatment method, and one may use conventional solid-liquid separation methods known to those skilled in the art such as filtration and centrifugation. For example, it may be accomplished by using a centrifugal deliquoring device which uses filter fabric.

It is preferable that deliquoring treatment be conducted so that solid content in the cake is 30-80% by mass.

The amount of the aforementioned solid content is calculated from the differential amount before and after 1 g of cake is dried for 2 hours at 105° C.

Water content in the aforementioned whole solvent of water-compatible organic solvent or mixed solvent may be confirmed by, for example, a method wherein the slurry is subjected to still standing or centrifugation, the supernatant is extracted, and water content is measured, or a method wherein the slurry or cake following addition of the water-compatible organic solvent or mixed solvent is subjected to deliquoring treatment, and the water content of the deliquored liquid is measured.

The amount of water content in liquid may be measured by Karl Fischer's method using a commercially available water-content measurement device such as the AQV-7 Trace Water Measurer manufactured by Hiranuma Sangyo Co., Ltd.

After the aforementioned neutralization, the cationized cellulose contains salt that is produced by neutralization. The treatment by water-compatible organic solvent or mixed solvent of this step may be combined with a purification step that cleans and removes this salt, but when the amount of water content in the water-compatible organic solvent or mixed solvent that is used as the cleaning fluid is small, the efficiency of removal of neutralization salt declines, and there is a risk that neutralization salt may remain in the obtained cationized cellulose.

Consequently, from the standpoint of neutralization salt removal efficiency, before addition of the water-compatible organic solvent or mixed solvent that serves to bring water content to 10% by mass or less, it is preferable to conduct cleaning (purification) of the cationized cellulose using a mixed solvent of water-compatiable organic solvent and water with a water content on the order of 15-30% by mass.

<<Silane-modified Cationized Cellulose>>

The silane-modified cationized cellulose of the present invention is silane-modified cationized cellulose that is produced by the aforementioned production method of the present invention.

There are no particular limitations on the form of the silane-modified cationized cellulose of the present invention, and it may be appropriately selected according to purpose. Taking into consideration aqueous dispersibility, solubility and the like, a powder state is preferable.

In the case of powder, the particle size of the aforementioned silane-modified cationized cellulose may be appropriately selected according to purpose of use and so on. It is preferable that the aforementioned particle size be 10-1,000 µm; 30-800 µm is more preferable, and 50-600 µm still more preferable. When the aforementioned particle size is 10 µm or greater, aqueous dispersibility is enhanced, generation of dust during use is inhibited, and handling properties are satisfactory.

When the aforementioned particle size is 1,000 µm or less, solubility in water is satisfactory.

With respect to the silane-modified cationized cellulose of the present invention, it is preferable that pH when used as a 2% by mass aqueous solution be 5-7.5 under conditions of 25° C. When the aforementioned pH is 7.5 or less, aqueous dispersibility is enhanced, and when 5 or more, solubility in water is enhanced.

As described above, the silane-modified cationized cellulose of the present invention has excellent aqueous dispersibility, and is easily dispersed in a short time when introduced into an aqueous solvent such as water or a mixed solvent of water and water-compatible organic solvent. Solubility in aqueous solvents is also excellent. Moreover, it also has excellent safety compared to cationized cellulose that is subjected to conventional glyoxal treatment. Consequently, it is useful in a wide range of applications such as, for example, conditioning agents for shampoos and body soaps, hair cosmetics, basic skin care products, makeup, perfumed toiletries, suntan products, sunscreens, nail care products, and bath care products. Among these, it is particularly useful for conditioning agents.

EXAMPLES

The present invention is described below in further detail by means of examples, but the present invention is not limited by these examples.

In the following examples, unless otherwise specified, "parts" and "%" respectively indicate parts by mass and % by mass.

The raw materials, reagents, analytic methods and evaluation methods used in the following examples and comparative examples are as follows.

(1) Raw Materials, Employed Reagents, and the Like

Hydroxyethyl cellulose: AH-15L manufactured by Sumitomo Seika Chemicals Co., Ltd.; 80% purity; 2% by mass aqueous solution viscosity (25° C.): 1,200 mPa·s.

Isopropyl alcohol: manufactured by Kanto Kagaku Co., Inc.; 99.5% purity.

Sodium hydroxide: manufactured by Kanto Kagaku Co., Inc.

Glycidyl trimethylammonium chloride: SY-GTA80 manufactured by Sakamoto Yakuhin Kogyo Co., Ltd.; effective portion: 73% aqueous solution 3-aminopropyltriethoxy silane: KBE-903 manufactured by Shin-Etsu Chemical Co., Ltd.; effective portion: 100%

(2) Analytic Methods (a) Water Content in Solvent (%) (Karl Fischer's Method)

Water content in solvent is a proportion of the water content amount in whole solvent that contacts the cationized cellulose before silane treatment. The water content indicates the proportion of the water content amount in the supernatant in Examples 1-16 and Comparative Examples 1-9, and in the liquid that is deliquored prior to silane treatment in example 8 and comparative example 5.

The AQV-7 Trace Water Measurer manufactured by Hiranuma Sangyo Co., Ltd. was used, and 0.3 g was provided for analysis as the sample amount.

(b) Amount of Treatment Silane (%)

Amount of treatment silane is calculated by the following formula.

$$\text{Amount of treatment silane} = (B/A) \times 100 (\%)$$

(In the formula, A is the effective additive amount (total mass (g)×purity (%)) of aqueous cellulose ether (hydroxyethyl cellulose); B is the effective additive amount (total mass (g)×effective portion (%)) of silane compound (3-aminopropyltriethoxy silane).)

(c) pH Measurement Method pH measurement was conducted using pH meter "PH71" manufactured by Yokogawa Electric Corporation.

(3) Evaluation Methods

The powdered silane-modified cationized cellulose obtained in each example and comparative example was sifted with a sieve, and the obtained material with a particle size of 106-425 μm served as samples, and was used in the following evaluation.

(a) Aqueous Dispersibility (i) Amount of Dispersion After Two Minutes

Distilled water amounting to 50 g was added to a 100 mL beaker, and a sample of 0.5 g was introduced from a height of 4 cm above the surface of the water. Two minutes after introduction of the sample, the proportion (%) of powder that did not remain on the surface of the water and that had dispersed into the water was evaluated by visual observation, and this was considered as the amount of dispersion after two minutes.

(ii) Time Until Complete Dispersion

Distilled water amounting to 50 g was added to a 100 mL beaker, and a sample of 0.5 g was introduced from a height of 4 cm above the surface of the water. After completing the introduction of the sample, the time until complete dispersion of the powder in the water was measured, and this was considered as the time until complete dispersion. With respect to powder which had not completely dispersed even after the elapse of 300 seconds, measurement was terminated at that point, and an evaluation of "300 seconds or more" was given.

(b) Dissolution Time

Distilled water with a temperature of 25° C. and amounting to 150 g was added to a 200 mL tall beaker (outer diameter: 6 cm), and was agitated by agitator blades that had been set in a HEIDON three-one motor (manufactured by Shinto Scientific Co., Ltd). The agitator blades used a fan turbine type (double paddle) of ϕ40 mm, and the bottom of the blades was set so as to be 2 cm above the bottom of the beaker. The rotational frequency of agitation was set to 400 rpm.

A sample of 3.5 g was added during agitation, and bathing in a water bath of 70° C. was conducted immediately afterward while agitation was continued. After introduction of the sample, the time until the sample had completely dissolved and a clear liquid was obtained was measured by visual observation.

Example 1

50 g of hydroxyethyl cellulose, 500 g of a mixed solvent wherein isopropyl alcohol/water (mass ratio)=85/15, and further 7.1 g of a 25% by mass sodium hydroxide aqueous solution were placed in a separable flask, and agitated and mixed for 30 minutes. Subsequently, agitation was stopped to produce a stationary condition, and 250 g of the supernatant of the mixed solvent was removed. Next, the temperature of the remainder of the separable flask was raised to 50° C., 24 g of glycidyl trimethylammonium chloride was added as a cationizing agent, and agitation was continued for 3 hours at 50° C. Subsequently, a 10% by mass isopropyl alcohol hydrochloride solution was added to produce a pH of 4.5 (temperature: 50° C.), and a cationized cellulose slurry was obtained. Next, 1350 g of isopropyl alcohol (99.5%) was added to this slurry, and agitation/mixing was conducted for 15 minutes. Subsequently, agitation was stopped to produce a stationary condition, and 1400 g of the supernatant liquid was removed. Water content in this supernatant liquid was 2%. Next, this slurry was heated to 50° C., 1.2 g of 3-aminopropyltriethoxy silane was added, and mixing was conducted for 45 minutes. This slurry then underwent deliquoring using a centrifugal hydroextractor, reduced-pressure drying (105° C.) was conducted for 5 hours, and the target silane-modified cationized cellulose was obtained. The pH of a 2% aqueous solution of the aforementioned silane-modified cationized cellulose was 7.0 (temperature: 25° C.).

Example 2

After performing the same procedure as example 1 to obtain cationized cellulose slurry that is prepared with a pH of 4.5, 550 g of isopropyl alcohol (99.5%) was added to the obtained slurry, and agitation/mixing was conducted. Subsequently, agitation was stopped to produce a stationary condition, and 600 g of the supernatant was extracted. Water content in this supernatant liquid was 7%. Thereafter, the same treatment was conducted as in example 1, and the target silane-modified cationized cellulose was obtained. The pH of a 2% aqueous solution of the aforementioned silane-modified cationized cellulose was 6.3 (temperature: 25° C.).

Example 3

Silane-modified cationized cellulose was obtained by the same method used in example 2, except that 0.2 g of 3-aminopropyltriethoxy silane was added. The pH of a 2% aqueous solution of the aforementioned silane-modified cationized cellulose was 5.6 (temperature: 25° C.).

Example 4

Silane-modified cationized cellulose was obtained by the same method used in example 2, except that 0.36 g of 3-aminopropyltriethoxy silane was added. The pH of a 2% aqueous solution of the aforementioned silane-modified cationized cellulose was 5.8 (temperature: 25° C.).

Example 5

Silane-modified cationized cellulose was obtained by the same method used in example 2, except that 0.8 g of 3-aminopropyltriethoxy silane was added. The pH of a 2% aqueous solution of the aforementioned silane-modified cationized cellulose was 6.1 (temperature: 25° C.).

Example 6

Silane-modified cationized cellulose was obtained by the same method used in example 2, except that 2.0 g of 3-aminopropyltriethoxy silane was added. The pH of the slurry at the time of neutralization was 4.0 (temperature: 50° C.), and the pH of a 2% aqueous solution of the obtained silane-modified cationized cellulose was 6.6 (temperature: 25° C.).

Example 7

Silane-modified cationized cellulose was obtained by the same method used in example 2, except that 4.0 g of 3-aminopropyltriethoxy silane was added. The pH of the slurry at the time of neutralization was 2.6 (temperature: 50° C.), and the pH of a 2% aqueous solution of the obtained silane-modified cationized cellulose was 7.1 (temperature: 25° C.).

Example 8

50 g of hydroxyethyl cellulose, 500 g of a mixed solvent wherein isopropyl alcohol/water (mass ratio)=85/15, and further 7.1 g of a 25% by mass sodium hydroxide aqueous solution were placed in a separable flask, and agitated and mixed for 30 minutes. Subsequently, agitation was stopped to produce a stationary condition, and 250 g of the supernatant of the mixed solvent was removed. Next, the temperature of the remainder of the separable flask was raised to 50° C., 24 g of glycidyl trimethylammonium chloride was added as a cationizing agent, and agitation was continued for 3 hours at 50° C. Subsequently, a 10% by mass isopropyl alcohol hydrochloride solution was added to produce a pH of 4.5 (temperature: 50° C.). This slurry then underwent deliquoring using a centrifugal hydroextractor, and a cationized cellulose cake was obtained. Subsequently, this cake was redispersed in a mixed solvent of 250 g wherein isopropyl alcohol/water (mass ratio)=79/21, and agitation/mixing was conducted for 15 minutes.

This slurry was then deliquored using a centrifugal hydroextractor. Furthermore, 93 g of isopropyl alcohol (99.5%) was added to the obtained cake, agitation/mixing was conducted for 15 minutes, and the obtained slurry was deliquored using a centrifugal hydroextractor. Water content in the liquid that was deliquored at this time was 7%. The obtained cationized cellulose cake was sprayed with 0.5 g of 3-aminopropyltriethoxy silane, was agitated and mixed, and subsequently underwent reduced-pressure drying (105° C.) for 5 hours to obtain the target silane-modified cationized cellulose.

The pH of a 2% aqueous solution of the aforementioned silane-modified cationized cellulose was 5.6 (temperature: 25° C.).

Example 9

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 5.8. Water content in this supernatant liquid was 19%. This slurry was then heated to 50° C., 1.2 g of 3-aminopropyltriethoxy silane was added, and mixing was conducted for 45 minutes. This slurry was then deliquored using a centrifugal hydroextractor, reduced-pressure drying was conducted for 5 hours at 125° C., and the target cationized cellulose was obtained.

Example 10

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 4.5. Water content in this supernatant liquid was 20%. This slurry was then heated to 50° C., 4.0 g of 3-aminopropyltriethoxy silane was added, and mixing was conducted for 45 minutes. This slurry was then deliquored using a centrifugal hydroextractor, reduced-pressure drying was conducted for 5 hours at 125° C., and the target cationized cellulose was obtained.

Example 11

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 5.8. Water content in this supernatant liquid was 19%. This slurry was then heated to 50° C., 0.8 g of 3-aminopropyltriethoxy silane was added, and mixing was conducted for 45 minutes. This slurry was then deliquored using a centrifugal hydroextractor, reduced-pressure drying was conducted for 5 hours at 135° C., and the target cationized cellulose was obtained.

Example 12

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 5.2. Water content in this supernatant liquid was 19%. This slurry was then heated to 50° C., 2.0 g of 3-aminopropyltriethoxy silane was added, and mixing was conducted for 45 minutes. This slurry was then deliquored using a centrifugal hydroextractor, reduced-pressure drying was conducted for 5 hours at 135° C., and the target cationized cellulose was obtained.

Example 13

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 4.7. Water content in this supernatant liquid was 20%. This slurry was then heated to 50° C., 3.2 g of 3-aminopropyltriethoxy silane was added, and mixing was conducted for 45 minutes. This slurry was then deliquored using a centrifugal hydroextractor, reduced-pressure drying was conducted for 5 hours at 135° C., and the target cationized cellulose was obtained.

Example 14

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 4.5. Water content in this supernatant liquid was 20%. This slurry was then heated to 50° C., 4.0 g of 3-aminopropyltriethoxy silane was added, and mixing was conducted for 45 minutes. This slurry was then deliquored using a centrifugal hydroextractor, reduced-pressure drying was conducted for 5 hours at 135° C., and the target cationized cellulose was obtained.

Example 15

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing were conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 5.8. Water content in this supernatant liquid was 19%. This slurry was then heated to 50° C., 0.8 g of 3-aminopropyltriethoxy silane was added, and mixing was conducted for 45 minutes. This slurry was then deliquored using a centrifugal hydroextractor, reduced-pressure drying was conducted for 5 hours at 145° C., and the target cationized cellulose was obtained.

Example 16

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 4.5. Water content in this supernatant liquid was 20%. This slurry was then heated to 50° C., 4.0 g of 3-aminopropyltriethoxy silane was added, and mixing was conducted for 45 minutes. This slurry was then deliquored using a centrifugal hydroextractor, reduced-pressure drying was conducted for 5 hours at 145° C., and the target cationized cellulose was obtained.

Comparative Example 1

After performing the same procedure as in example 1 to obtain cationized cellulose slurry prepared with a pH of 4.5, still standing separation was conducted as is without conducting the treatment of adding isopropyl alcohol (99.5%) to the obtained slurry, and 50 g of the supernatant was extracted. Water content in this supernatant liquid was 14%. Subsequently, the same treatment was conducted as in example 1 to obtain silane-modified cationized cellulose. The pH of a 2% aqueous solution of the aforementioned silane-modified cationized cellulose was 5.9 (temperature: 25° C.).

Comparative Example 2

After performing the same procedure as in example 1 to obtain cationized cellulose slurry prepared with a pH of 4.5, 13 g of distilled water was added to the slurry, and agitation/mixing was conducted for 15 minutes. Water content in this supernatant liquid was 17%. Subsequently, the same treatment was conducted as in example 1 to obtain silane-modified cationized cellulose. The pH of a 2% aqueous solution of the aforementioned silane-modified cationized cellulose was 5.7 (temperature: 25° C.).

Comparative Example 3

After performing the same procedure as in example 1 to obtain cationized cellulose slurry prepared with a pH of 4.5, 30 g of distilled water was added to the slurry, and agitation/mixing was conducted for 15 minutes. Water content in this supernatant liquid was 20%. Subsequently, the same treatment was conducted as in example 1 to obtain silane-modified cationized cellulose. The pH of a 2% aqueous solution of the aforementioned silane-modified cationized cellulose was 5.3 (temperature: 25° C.).

Comparative Example 4

Silane-modified cationized cellulose was obtained by the same method used in example 2, except that 0.04 g of 3-aminopropyltriethoxy silane was added. The pH of a 2% aqueous solution of the aforementioned silane-modified cationized cellulose was 5.3 (temperature: 25° C.).

Comparative Example 5

After conducting the same procedure as in example 8 until deliquoring by centrifugal hydroextractor of a slurry prepared with a pH of 4.5 and obtainment of cationized cellulose cake, the obtained cake was redispersed in a mixed solvent of 250 g wherein isopropyl alcohol/water (mass ratio)=79/21, and agitation/mixing was conducted for 15 minutes. This slurry was then deliquored by centrifugal hydroextractor. Water content in the liquid that was deliquored at this time was 20%. The obtained cationized cellulose cake was sprayed with 0.5 g of 3-aminopropyltriethoxy silane, was agitated and mixed, and subsequently underwent reduced-pressure drying (105° C.) for 5 hours to obtain the silane-modified cationized cellulose. The pH of the slurry at the time of neutralization was 4.0 (temperature: 50° C.), and the pH of a 2% aqueous solution of the obtained silane-modified cationized cellulose was 5.6 (temperature: 25° C.).

Comparative Example 6

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 5.6. Water content in this supernatant liquid was 19%. This slurry was then heated to 50° C., 1.2 g of 3-aminopropyltriethoxy silane was added, and mixing was conducted for 45 minutes. This slurry was then deliquored with a centrifugal hydroextractor, reduced-pressure drying was conducted for 5 hours at 100° C., and the target cationized cellulose was obtained.

Comparative Example 7

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 5.6. Water content in this supernatant liquid was 19%. This slurry was then heated to 50° C., 1.2 g of 3-aminopropyltriethoxy silane was added, and mixing was conducted for 45 minutes. This slurry was then deliquored with a centrifugal hydroextractor, reduced-pressure drying was conducted for 5 hours at 115° C., and the target cationized cellulose was obtained.

Comparative Example 8

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 6.0. Water content in this supernatant liquid was 19%. This slurry was then heated to 50° C., 0.04 g of 3-aminopropyltriethoxy silane was added, and mixing was conducted for 45 minutes. This slurry was then deliquored with a centrifugal hydroextractor, reduced-pressure drying was conducted for 5 hours at 145° C., and the target cationized cellulose was obtained.

Comparative Example 9

500 g of a mixed solvent in which isopropyl alcohol/water (mass ratio)=85/15 and further 7.1 g of a 25% by mass sodium hydroxide aqueous solution were added to 50 g of hydroxyethyl cellulose, and mixed together. Subsequently, agitation/mixing was conducted for 30 minutes, and 250 g of the supernatant of the mixed solvent was extracted. The temperature was then raised to 50° C., 24 g of glycidyl trimethylammonium chloride was added as a cationizing agent, and reaction proceeded for 3 hours. Subsequently, a 10% by mass IPA hydrochloride solution was added to obtain cationized cellulose slurry prepared with a pH of 6.0. Water content in this supernatant liquid was 19%. This slurry was then heated to 50° C., 0.2 g of 3-aminopropyltriethoxy silane was added, and mixing was conducted for 45 minutes. This slurry was then deliquored with a centrifugal hydroextractor, reduced-pressure drying was conducted for 5 hours at 145° C., and the target cationized cellulose was obtained.

With respect to the silane-modified cationized cellulose obtained in the aforementioned examples 1-16 and comparative examples 1-9, evaluation was conducted by the evaluation method shown in (3) above. The results are shown in Table 1 and Table 2.

TABLE 1

| | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 |
|---|---|---|---|---|---|---|---|---|---|---|---|---|---|---|---|---|
| Conditions | | | | | | | | | | | | | | | | |
| Amount of treatment silane (% by mass) | 3 | 3 | 0.5 | 0.9 | 2 | 5 | 10 | 1.3 | 3 | 10 | 2 | 5 | 8 | 10 | 2 | 10 |

TABLE 1-continued

|  | Example 1 | Example 2 | Example 3 | Example 4 | Example 5 | Example 6 | Example 7 | Example 8 | Example 9 | Example 10 | Example 11 | Example 12 | Example 13 | Example 14 | Example 15 | Example 16 |
|---|---|---|---|---|---|---|---|---|---|---|---|---|---|---|---|---|
| Water content in solvent (%) | 2 | 7 | 7 | 7 | 7 | 7 | 7 | 7 | 19 | 20 | 19 | 19 | 20 | 20 | 19 | 20 |
| Drying temperature (° C.) | 105 | 105 | 105 | 105 | 105 | 105 | 105 | 105 | 125 | 125 | 135 | 135 | 135 | 135 | 145 | 145 |
| Evaluations |  |  |  |  |  |  |  |  |  |  |  |  |  |  |  |  |
| Aqueous dispersibility — Dispersion amount after 2 minutes (%) | 100 | 100 | 95 | 100 | 100 | 100 | 100 | 100 | 100 | 100 | 100 | 100 | 100 | 100 | 100 | 100 |
| Time until complete dispersion (seconds) | 20 | 16 | 150 | 41 | 34 | 8 | 10 | 21 | 22 | 17 | 15 | 18 | 22 | 17 | 15 | 18 |
| Dissolution time (minutes) | 6 | 6 | 40 | 23 | 15 | 8 | 4 | 9 | 6 | 8 | 9 | 8 | 6 | 8 | 9 | 8 |

TABLE 2

|  | Comparative example 1 | Comparative example 2 | Comparative example 3 | Comparative example 4 | Comparative example 5 | Comparative example 6 | Comparative example 7 | Comparative example 8 | Comparative example 9 |
|---|---|---|---|---|---|---|---|---|---|
| Conditions |  |  |  |  |  |  |  |  |  |
| Amount of treatment silane (% by mass) | 3 | 3 | 3 | 0.1 | 1.3 | 3 | 3 | 0.1 | 0.5 |
| Water content in solvent (%) | 14 | 17 | 20 | 7 | 20 | 19 | 19 | 19 | 19 |
| Drying temperature (° C.) | 105 | 105 | 105 | 105 | 105 | 100 | 115 | 145 | 145 |
| Evaluations |  |  |  |  |  |  |  |  |  |
| Aqueous dispersibility — Dispersion amount after 2 minutes (%) | 90 | 90 | 90 | 20 | 90 | 50 | 90 | 20 | 45 |
| Time until complete dispersion (seconds) | 300 or more | 300 or more | 300 or more | 300 or more | 300 or more | 300 or more | 150 | 300 or more | 300 or more |
| Dissolution time (minutes) | 8 | 18 | 56 | 60 | 50 | 20 | 13 | 23 | 35 |

As is clear from the foregoing results, the silane-modified cationized cellulose obtained in examples 1-16 exhibits excellent aqueous dispersibility in that the amount of dispersion after two minutes is large, and time until complete dispersion is short. Moreover, dissolution time is also short. Aqueous dispersibility was particularly satisfactory in examples 1-2 and 4-16 where the amount of treatment silane is 0.9-10% by mass.

On the other hand, with respect to the silane-modified cationized cellulose obtained in comparative examples 1-3 and 5-9 where water content in the solvent before silane treatment was more than 10% by mass, aqueous dispersibility was poor compared to examples 1-8 in that the amount of dispersion after two minutes was small, and the time until complete dispersion was in all cases, apart from comparative example 7, 300 seconds or more. With respect to comparative examples 4 and 8 where the amount of treatment silane was 0.1% by mass, both the dispersion amount after two minutes and the time until complete dispersion were very poor. Moreover, it was in comparative example 4 that dissolution time was longest.

INDUSTRIAL APPLICABILITY

According to the method of producing silane-modified cationized cellulose of the present invention, silane-modified cationized cellulose with excellent aqueous dispersibility can be produced.

What is claimed is:

1. A method of producing silane-modified cationized cellulose, comprising the steps of:
   (1) cationizing water-soluble cellulose ether in the presence of alkali in a mixed solvent of a water-compatible organic solvent and water to obtain a slurry comprising cationized cellulose;
   (2) adding acid to said slurry and neutralizing said alkali;
   (3) reacting said cationized cellulose obtained after said neutralization with an aminosilane compound which is 0.3-10% by mass relative to an amount of water-soluble cellulose ether used as raw material of said cationized cellulose; and
   (4) drying and powderizing the product obtained in step (3), wherein
      drying is conducted in step (4) at a temperature of 115-160° C. until weight loss on drying is 5% by weight or less, or
      the method further comprises the step (5) of adding a water-compatible organic solvent or a mixed solvent of a water-compatible organic solvent and water to said cationized cellulose obtained in step (2) so that the water content in the total solvent is 10% by mass or less before performing step (3).

2. The production method according to claim 1, wherein the step (3) is conducted with an addition of an aminosilane compound to said slurry obtained in the step (2).

3. The production method according to claim 1, wherein the step (3) is conducted with addition of an aminosilane compound to a cake obtained by conducting deliquoring treatment with respect to said slurry obtained in the step (2).

4. The production method according to claim 1, wherein the step (5) is conducted by adding a water-compatible organic solvent or a mixed solvent of water-compatible organic solvent and water to said slurry obtained in the step (2), and mixing and agitating said slurry.

5. The production method according to claim 1, wherein the step (5) is conducted by performing deliquoring treatment with respect to said slurry obtained in the step (2), and by adding a water-compatible organic solvent or a mixed solvent of water-compatible organic solvent and water to the obtained cake.

6. Silane-modified cationized cellulose produced by the method of producing silane-modified cationized cellulose according to claim 1.

7. A method of producing silane-modified cationized cellulose, comprising the steps of:
   (1) cationizing water-soluble cellulose ether in the presence of alkali in a mixed solvent of a water-compatible organic solvent and water to obtain a slurry comprising cationized cellulose;
   (2) adding acid to said slurry and neutralizing said alkali;
   (3) reacting said cationized cellulose obtained after said neutralization with an aminosilane compound which is 0.9-10% by mass relative to an amount of water-soluble cellulose ether used as raw material of the cationized cellulose; and
   (4) drying and powderizing the product obtained in step (3) at a temperature of 115-160° C. until weight loss on drying is 5% by weight or less.

8. A method of producing silane-modified cationized cellulose, comprising the steps of:
   (1) cationizing water-soluble cellulose ether in the presence of alkali in a mixed solvent of a water-compatible organic solvent and water to obtain a slurry comprising cationized cellulose;
   (2) adding acid to said slurry and neutralizing said alkali;
   (3) reacting said cationized cellulose obtained after said neutralization with an aminosilane compound which is 0.3-10% by mass relative to an amount of water-soluble cellulose ether used as raw material of the cationized cellulose;
   (4) drying and powderizing the product obtained in step (3), and
   (5) adding a water-compatible organic solvent or a mixed solvent of a water-compatible organic solvent and water to said cationized cellulose obtained in step (2) so that the water content in the total solvent is 10% by mass or less before performing step (3).

9. The method according to claim 7, wherein step (3) is conducted with an addition of an aminosilane compound to said slurry obtained in step (2).

10. The method according to claim 7, wherein step (3) is conducted with addition of an aminosilane compound to a cake obtained by conducting deliquoring treatment with respect to said slurry obtained in step (2).

11. The method according to claim 8, wherein step (3) is conducted with an addition of an aminosilane compound to said slurry obtained in step (2).

12. The method according to claim 8, wherein step (3) is conducted with addition of an aminosilane compound to a cake obtained by conducting deliquoring treatment with respect to said slurry obtained in step (2).

13. The method according to claim 8, wherein step (5) is conducted by adding a water-compatible organic solvent or a mixed solvent of water-compatible organic solvent and water to said slurry obtained in step (2), and mixing and agitating said slurry.

14. The method according to claim 8, wherein step (5) is conducted by performing deliquoring treatment with respect to said slurry obtained in step (2), and by adding a water-compatible organic solvent or a mixed solvent of water-compatible organic solvent and water to the obtained cake.

* * * * *